US007010997B2

(12) United States Patent
Dzurnak

(10) Patent No.: US 7,010,997 B2
(45) Date of Patent: Mar. 14, 2006

(54) MOTORCYCLE GRIP WITH GRIP HEATER AND METHOD OF MAKING SAME

(75) Inventor: Stanislav Dzurnak, Oberschleissheim (DE)

(73) Assignee: Bayerische Motoren Werke AG, Munich (DE)

( * ) Notice: Subject to any disclaimer, the term of this patent is extended or adjusted under 35 U.S.C. 154(b) by 69 days.

(21) Appl. No.: 10/224,581

(22) Filed: Aug. 21, 2002

(65) Prior Publication Data

US 2003/0056618 A1 Mar. 27, 2003

(30) Foreign Application Priority Data

Aug. 22, 2001 (DE) ................................ 101 41 049

(51) Int. Cl.
*B62K 21/26* (2006.01)
*H05B 1/02* (2006.01)

(52) U.S. Cl. ...................... 74/551.9; 219/204; 219/549

(58) Field of Classification Search ............... 74/551.9, 74/552; 219/533, 204, 202, 494, 505, 506, 219/549
See application file for complete search history.

(56) References Cited

U.S. PATENT DOCUMENTS

| | | | | |
|---|---|---|---|---|
| 1,429,799 | A | 9/1922 | Tesdell | |
| 2,014,677 | A * | 9/1935 | Williams | 219/534 |
| 4,471,209 | A * | 9/1984 | Hollander | 219/204 |
| 4,547,655 | A | 10/1985 | Kurata et al. | |
| 4,937,429 | A * | 6/1990 | Hollander | 219/204 |
| 4,990,753 | A * | 2/1991 | Hollander | 219/505 |
| 5,613,407 | A | 3/1997 | Ogata | |
| 5,626,780 | A | 5/1997 | Ogata | |
| 5,910,266 | A * | 6/1999 | Jones | 219/528 |
| 6,114,668 | A * | 9/2000 | Ogata et al. | 219/494 |
| 6,326,593 | B1 * | 12/2001 | Bonn et al. | 219/204 |
| 6,686,572 | B1 * | 2/2004 | Wu | 219/533 |
| 2004/0007567 | A1 * | 1/2004 | Downey et al. | 219/494 |
| 2005/0173406 | A1 * | 8/2005 | Kurumagawa et al. | 219/482 |

FOREIGN PATENT DOCUMENTS

| | | | | |
|---|---|---|---|---|
| DE | 2951871 | | 7/1981 | |
| DE | 33 44 582 | | 6/1985 | |
| DE | 3344582 | | 6/1985 | |
| DE | 19526029 | | 1/1996 | |
| DE | 20016633 | | 1/2000 | |
| EP | 001371544 | A1 * | 12/2003 | 74/551.9 |
| FR | 2254204 | * | 7/1975 | 219/204 |
| FR | 2800701 | * | 5/2001 | 219/204 |
| JP | 1-145264 | * | 6/1989 | 74/551.9 |
| JP | 5-254476 | | 5/1993 | |
| JP | 10-81282 | * | 3/1998 | 219/204 |
| JP | 2002-145153 | * | 5/2002 | 219/204 |
| WO | WO-87/03853 | * | 7/1987 | 74/551.9 |

* cited by examiner

*Primary Examiner*—Vinh T. Luong
(74) *Attorney, Agent, or Firm*—Crowell & Moring LLP

(57) ABSTRACT

A two-wheeler or motorcycle grip has an electric heating element whose supply line is arranged or wound in a spiral shape in the area of the motorcycle grip. The winding axis of the supply line is substantially parallel to the longitudinal axis of the motorcycle grip. When the motorcycle grip is rotated, the supply line can deform similarly to a torsion spring in the rotating or circumferential direction, which is connected with only a very slight mechanical stressing of the line element.

5 Claims, 3 Drawing Sheets

MOTORCYCLE GRIP WITH GRIP HEATER AND METHOD OF MAKING SAME

BACKGROUND AND SUMMARY OF THE INVENTION

This application claims the priority of German Patent Document 101 41 049.2, filed on Aug. 22, 2001, the disclosure of which is expressly incorporated by reference herein.

The present invention relates to a motorcycle grip rotatably arrange on an end of a handlebar tube comprising an electric heating element which is supplied with current by way of an electric line element.

From German Patent Document DE 200 16 633 U1, a heatable rotatable motorcycle gas grip is known, in the case of which a resistance foil is integrated in the grip, which resistance foil is supplied with current by way of electric conductors. In order to reduce, in the case of a rotatable gas grip, the risk of a rupture of the electrical lines, the conductor ends are arranged around the handlebar tube and are freely inserted into a grooved surrounding guide which is provided in the handlebar tube. The conductor ends project out of a protective tube whose end is inserted into a lateral groove of the handlebar grip.

Heatable motorcycle grips are also known from German Patent Documents DE 195 25 748 C2, corresponding to U.S. Pat. No. 5,626,780, and DE 195 26 029 C2, corresponding to U.S. Pat. No. 5,613,407. However, in these, the problems of the mechanical stressing of the electric connection lines of a rotatable grip are not discussed in detail.

As a result of the rotating movements of the gas grip, the connection lines are subjected to mechanical stress, which frequently leads to damage and to a failure of the grip heating device. During the mounting, the electric supply cable of the grip heating device has to be threaded through the handlebar tube, which is difficult and mainly unreliable with respect to the process. Slight damage may already occur during this process, whereby a failure of the grip heating device is preprogrammed. A kinking and an axial twisting of the connection cable are frequent occurrences.

From prior art, it is known to thread an electric connection cable 1 for a heating element 2 of a gas twist grip 3 through the handlebar tube 4, as shown in FIGS. 1*a* and 1*b*.

From prior art, a variant is also known which is shown in FIGS. 2*a* and 2*b* and in which the electric connection cable 1 of the heating element 2 is guided out of the casing of the grip 3 and is laid in the form of an expansion loop 5 along the handlebar tube 4.

In both above-mentioned variants, the service life of the grip heating device or of its connection lines is unsatisfactory.

It is an aspect of certain preferred embodiments of the invention to reduce, in the case of a rotatable motorcycle grip supplied with current, the mechanical stress to the electric power supply caused by the rotation and to increase the service life.

This aspect may be accomplished in that in an area of the grip, the electric line element has a shape of a spiral with plural windings. Advantageous developments and further developments of certain preferred embodiments of the invention are described herein.

A basic principle of certain preferred embodiments of the invention is that a two-wheeler grip or motorcycle grip is provided in which the line element for the electric power supply has the shape of a spiral with several windings. More concretely, in the case of the motorcycle grip with an electric heating element, the supply line of the heating element is spirally arranged or wound in the area of the motorcycle grip. The winding axis of the supply line is substantially parallel to the longitudinal axis of the motorcycle grip. During a rotation of the motorcycle grip, the supply line can deform similarly to a torsion spring in the rotating or circumferential direction, which is connected with only a very slight mechanical straining of the line element.

The spiral windings of the supply line are preferably situated in a plane, which permits a very compact construction. The electric heating element of the motorcycle grip can be connected to the outer end of the supply line spiral. The inner end of the supply line spiral may extend in one piece out of the grip. As an alternative, a separate feed line can be connected or soldered to the inner end of the supply line spiral. The feed line may optionally be connected by way of an additional plug-type connection with the power supply of the motorcycle. The feed line is preferably arranged in the interior of the handlebar tube; that is, it is not visible from the outside. The spiral-shaped line element may be formed, for example, by two flexible single lines. As an alternative, the line element may also be formed by a flexible strip conductor foil.

Other objects, advantages and novel features of the present invention will become apparent from the following detailed description of the invention when considered in conjunction with the accompanying drawings.

DETAILED DESCRIPTION OF THE DRAWINGS

Figure 1A:
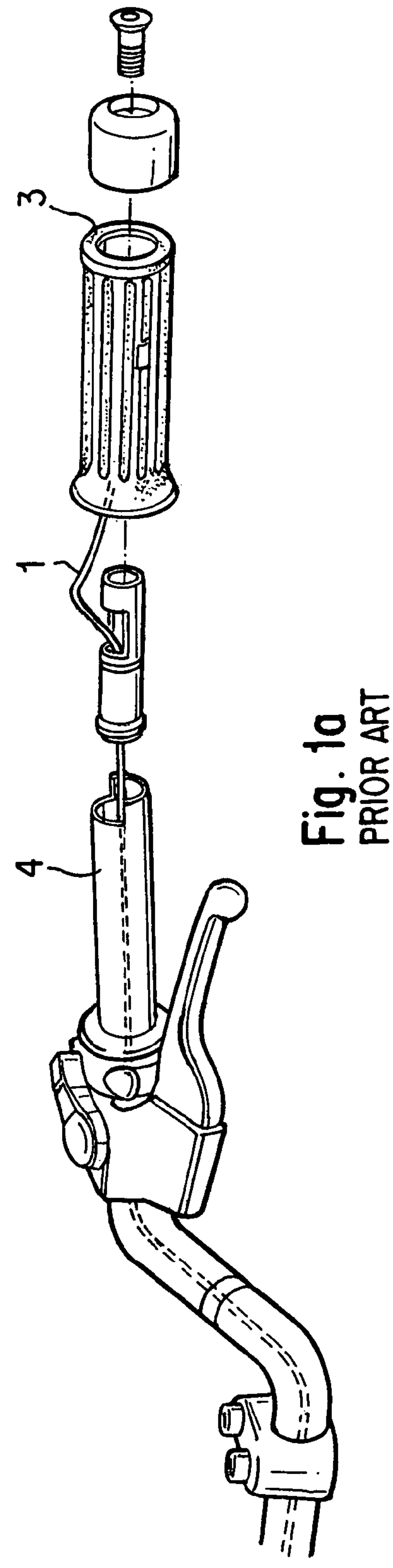
FIGS. 1*a* and 1*b* show a known grip arrangement with a heating device.
Figure 1B:
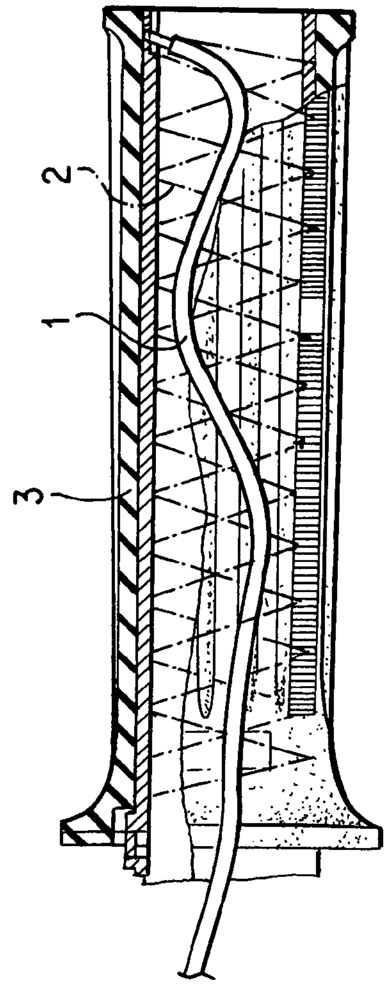
Figure 2A:
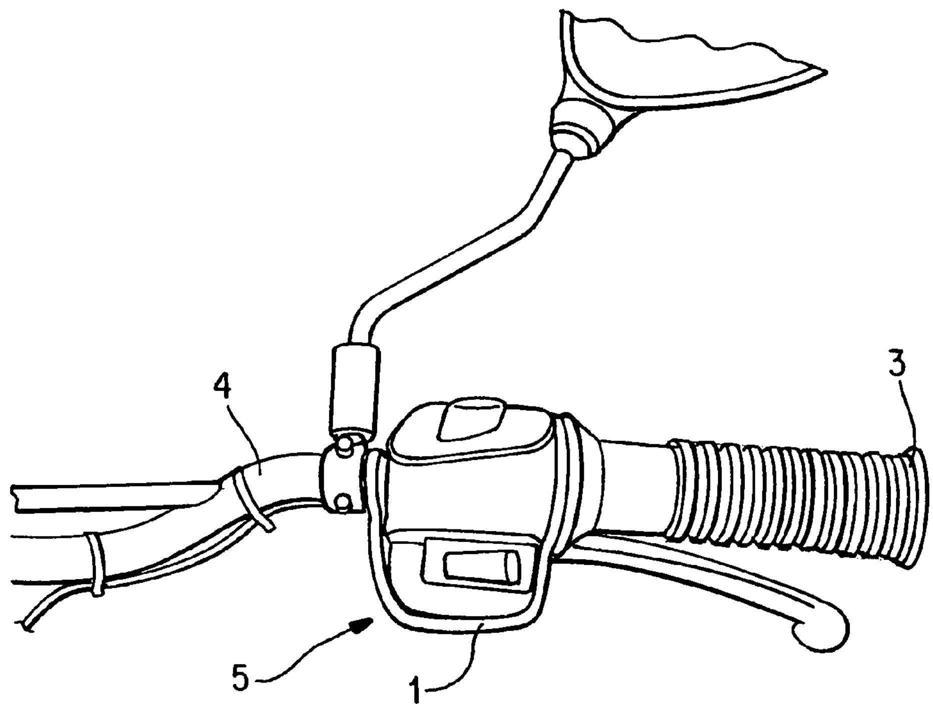
FIGS. 2*a* and 2*b* show a known grip arrangement with an expansion loop for the heating device.
Figure 2B:
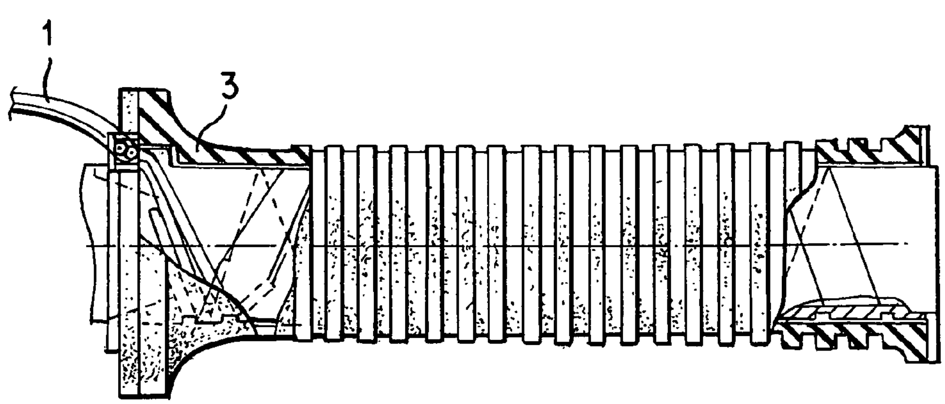
Figure 3:
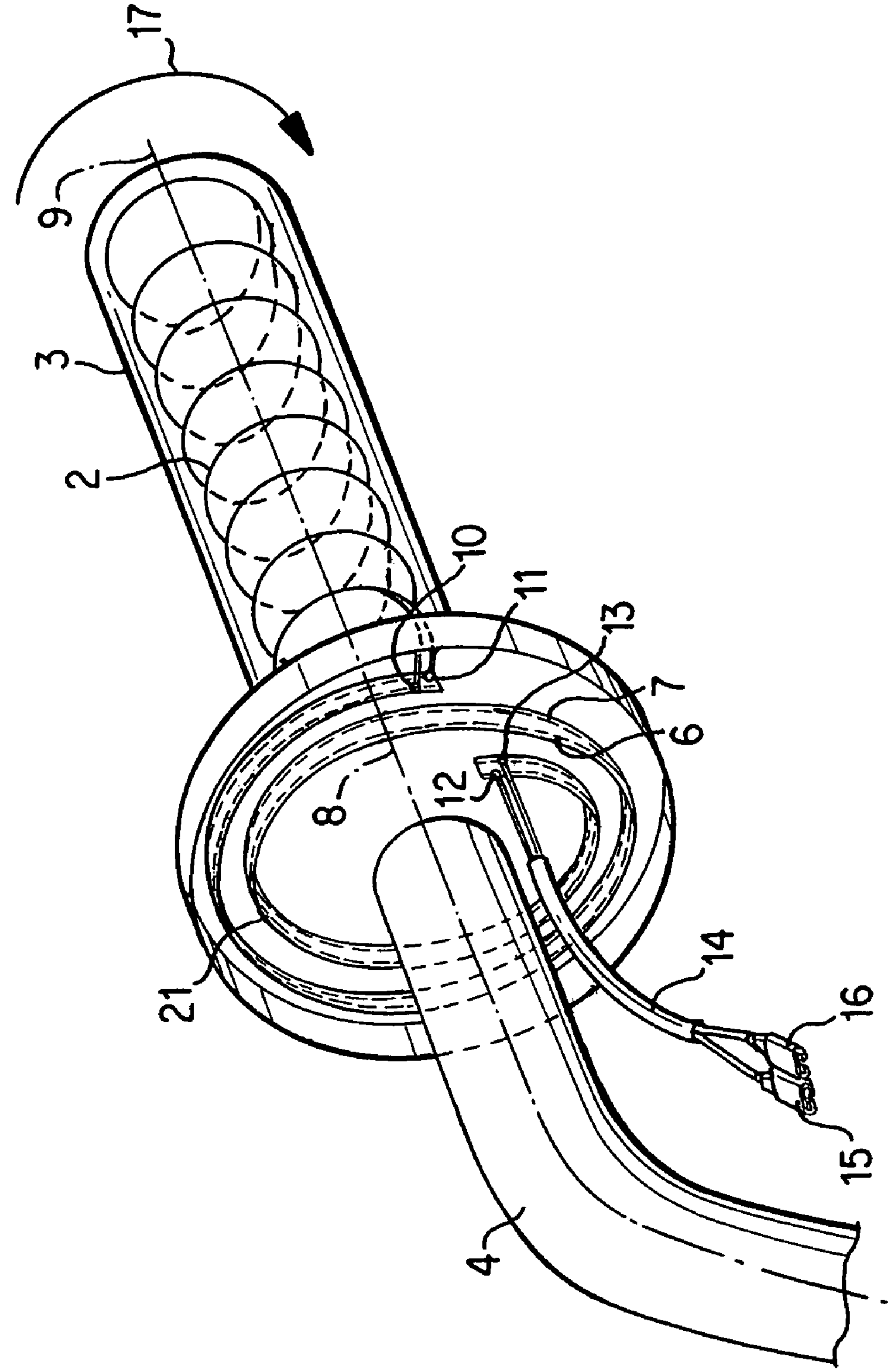
FIG. 3 shows a grip arrangement according to an embodiment of the invention.

FIG. 3 shows a line element 21 of a heating device 2 which is integrated in a rotatable motorcycle gas grip 3. The gas grip 3 is arranged at the free end of a handlebar tube 4.

Here, the line element 21 is a flexible strip conductor foil on which two individual lines 6, 7 are provided. The line element has the shape of a spiral, the individual spiral windings here being situated in a plane. The spiral is arranged such that its winding axis 8 is substantially parallel to a longitudinal axis 9 of the grip 3.

At the outer end of the line element 21, two connections 10, 11 are provided to which the heating element 2 is connected. At an inner end of the line element 21, two additional connections 12, 13 are provided to which a feeding cable 14 is connected, at whose end two plug-type elements 15, 16 are provided which are assigned to the lines 6, 7.

During the rotation of the gas grip 3, which is indicated by an arrow 17, the line element 21 can deform or twist unhindered. In this case, the mechanical stress on the line element 21 or the connections 10, 11, 12 and 13 is relatively low, whereby a long service life is obtained.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A grip rotatably arranged on an end of a handlebar tube, comprising an electric heating element which is supplied with current from a separate electric line element, wherein in an area of the grip, the line element has a shape of a spiral with plural windings, and the windings are situated in a plane, and the line element is formed by a flexible strip conductor foil on which two separate lines are provided.

2. The grip according to claim 1, wherein a winding axis of the spiral is substantially parallel to a longitudinal axis of the grip.

3. The grip according to claim 2, wherein the line element has an outer end and an inner end, the heating element being connected to the outer end.

4. The grip according to claim 1, wherein the line element has an outer end and an inner end, the heating element being connected to the outer end.

5. The grip according to claim 4, wherein a feed line is connected to the inner end.

* * * * *